(12) United States Patent
Jao et al.

(10) Patent No.: US 8,322,903 B2
(45) Date of Patent: Dec. 4, 2012

(54) LIGHT SOURCE MODULE

(75) Inventors: Jui-Nien Jao, Hsinchu (TW);
Chien-Hao Fu, Hsinchu (TW);
Chao-Min Yang, Hsinchu (TW)

(73) Assignee: Young Lighting Technology Inc.,
Hsin-Chu (TW)

( * ) Notice: Subject to any disclaimer, the term of this patent is extended or adjusted under 35 U.S.C. 154(b) by 220 days.

(21) Appl. No.: 12/954,303

(22) Filed: Nov. 24, 2010

(65) Prior Publication Data

US 2011/0149597 A1    Jun. 23, 2011

(30) Foreign Application Priority Data

Dec. 18, 2009    (TW) ................. 98223826 U

(51) Int. Cl.
*F21V 7/04*    (2006.01)

(52) U.S. Cl. ........ 362/607; 362/600; 362/602; 362/606; 362/611; 362/612; 362/613; 362/614

(58) Field of Classification Search ........ 362/97.1–97.4, 362/600–634
See application file for complete search history.

(56) References Cited

FOREIGN PATENT DOCUMENTS

TW    200834178    8/2008

*Primary Examiner* — Danielle Allen
(74) *Attorney, Agent, or Firm* — Muncy, Geissler, Olds & Lowe, PLLC

(57) ABSTRACT

A light source module includes a casing, at least one reflective layer, a light bar, and at least one light source. The casing has a first side wall and a second side wall, and the first side wall and the second side wall define an opening. The opening faces a light incident surface of a light guide plate, and the first side wall and the second side wall are respectively positioned on two opposite sides of the opening. The reflective layer is formed inside the casing and adjacent to one of the first side wall and the second side wall. The light bar is disposed inside the casing and forms an angle with the light incident surface of the light guide plate.

12 Claims, 5 Drawing Sheets

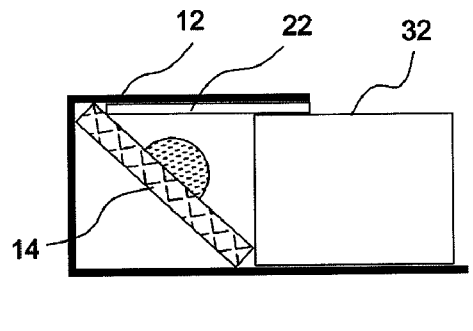
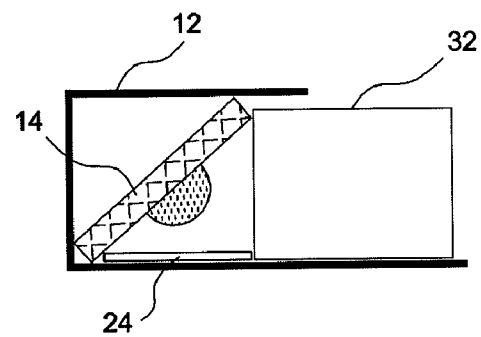
FIG. 7A            FIG. 7B
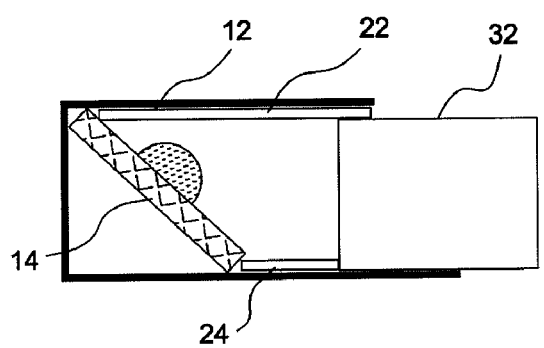
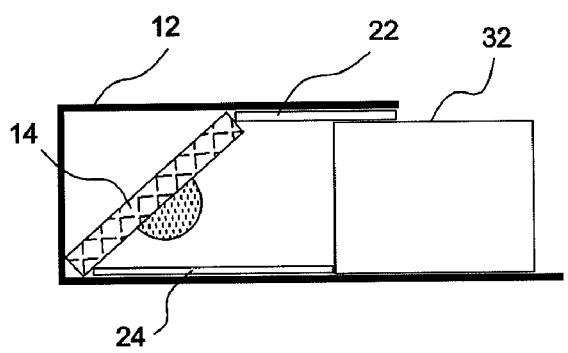
FIG. 7C            FIG. 7D
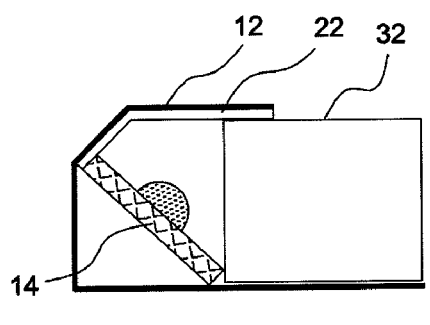
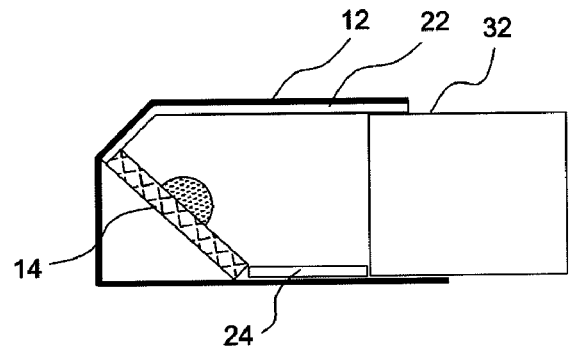
FIG. 7E            FIG. 7F

LIGHT SOURCE MODULE

BACKGROUND OF THE INVENTION a. Field of the Invention

The invention relates to a light source module.

b. Description of the Related Art

FIG. 1 shows a cross-section diagram illustrating a conventional light source module 100. Referring to FIG. 1, a light source module 100 includes a casing 102 and a light bar 104. At least one LED 106 is provided on a surface of the light bar 104. The light bar 104 is disposed in the casing 102 in a direction substantially parallel to a light incident surface 110a of a light guide plate 110. A light beam emitted by the LED 106 is reflected by side reflective layers 108 and then enters a front section of the light guide plate 110. Referring to the light paths shown in FIG. 2, since the light bar 104 is substantially parallel to the light incident surface 110a, yellowish white light Iy is incident on the light guide plate 110 at an angle α of about 35 to 80 degrees. Under the circumstance, the number of times the yellowish white light Iy is reflected within a specified distance is larger then the number of times the bluish white light Ib is reflected. In other words, the yellowish white light Iy is reflected to a great extent in the front section of the light guide plate 110 to result in a yellowish front section of the light guide plate 110 and thus decrease the overall color uniformity.

Further, as shown in FIG. 3, Taiwan patent publication no. 200834178 discloses an edge-lighting backlight module 200 having a reflective sheet 204. The reflective sheet 204 holds an LED 202 and slants inside a casing 206, so the reflective sheet 204 makes an angle γ to a light incident surface 208a of a light guide plate 208 so as to increase the amount of emitting light of the LED 202 received by the light guide plate 208. However, the manner that the reflective sheet 204 is disposed on a slant may improve the light utilization efficiency but fails to increase the overall color uniformity.

BRIEF SUMMARY OF THE INVENTION

The invention provides a light source module having substantially identical chromaticity in different light-emitting regions and having improved color uniformity.

Other objects and advantages of the invention may be further illustrated by the technical features broadly embodied and described as follows.

In order to achieve one or a portion of or all of the objects or other objects, one embodiment of the invention provides a light source module. The light source module includes a casing, at least one reflective layer, a light bar, and at least one light source. The casing has a first side wall and a second side wall, and the first side wall and the second side wall define an opening. The opening faces a light incident surface of a light guide plate, and the first side wall and the second side wall are respectively positioned on two opposite sides of the opening. The reflective layer is formed inside the casing and adjacent to one of the first side wall and the second side wall. The light bar is disposed inside the casing and forms an angle with the light incident surface of the light guide plate. The light source is disposed on one side of the light bar facing the opening, and the light source satisfies the following condition:

$$\Delta Cx(\theta) = \text{Max}[Cx(\theta)] - \text{Min}[Cx(\theta)] > 0.025; \text{ or}$$

$$\Delta Cy(\theta) = \text{Max}[Cy(\theta)] - \text{Min}[Cy(\theta)] > 0.04,$$

wherein the light source has a light-emitting plane, θ is an included angle formed between a connecting line and the normal of the light-emitting plane, the connecting line is connected between a point in the space and the center of the light-emitting plane, $Cx(\theta)$ is a chromaticity coordinate value x measured at angle θ, $\text{Max}[Cx(\theta)]$ is a maximum of the chromaticity coordinate value x measured at angle θ, $\text{Min}[Cx(\theta)]$ is a minimum of the chromaticity coordinate value x measured at angle θ, and $\Delta Cx(\theta)$ is a difference in the chromaticity coordinate value x measured at angle θ, $Cy(\theta)$ is a chromaticity coordinate value y measured at angle θ, $\text{Max}[Cy(\theta)]$ is a maximum of the chromaticity coordinate value y measured at angle θ, $\text{Min}[Cy(\theta)]$ is a minimum of the chromaticity coordinate value y measured at angle θ, and $\Delta Cy(\theta)$ is a difference in the chromaticity coordinate value y measured at angle θ.

In one embodiment, the light source module further includes a first reflective layer adjacent to the first side wall, and a second reflective layer adjacent to the second side wall and substantially parallel to the first reflective layer.

In one embodiment, the angle between the light bar and the light incident surface is smaller than 30 degrees and larger than 10 degrees.

The embodiment or the embodiments of the invention may have at least one of the following advantages. According to the above embodiments, since the light bar is disposed on a slant, the yellowish white light is incident on the light guide plate at a less steep angle, and thus the number of times the yellowish white light is reflected at a front end of the light guide plate is reduced. As a result, light beams with respective color tones have a substantially identical number of times of reflection to equalize the chromaticity in different light-emitting regions of the light guide plate and thus improve the color uniformity. Further, the manner that the light bar is on a slant inside the casing may reduce the occupied space of the casing and the thickness of the light guide plate.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIGS. 7A-7F show different arrangements of a light source module according to various embodiments of the invention.

DETAILED DESCRIPTION OF THE INVENTION

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
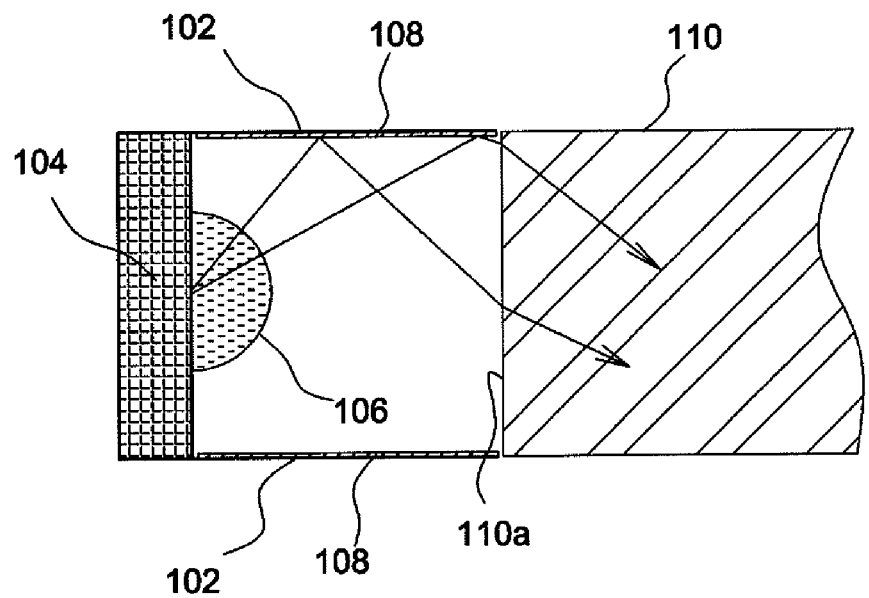
FIG. 1 shows a cross-section diagram illustrating a conventional light source module.
Figure 2:
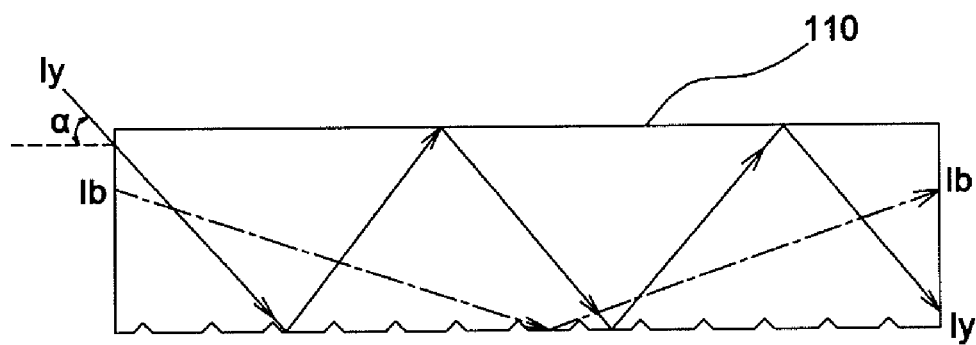
FIG. 2 shows a schematic diagram illustrating the light paths in the light source module of FIG. 1.
Figure 3:
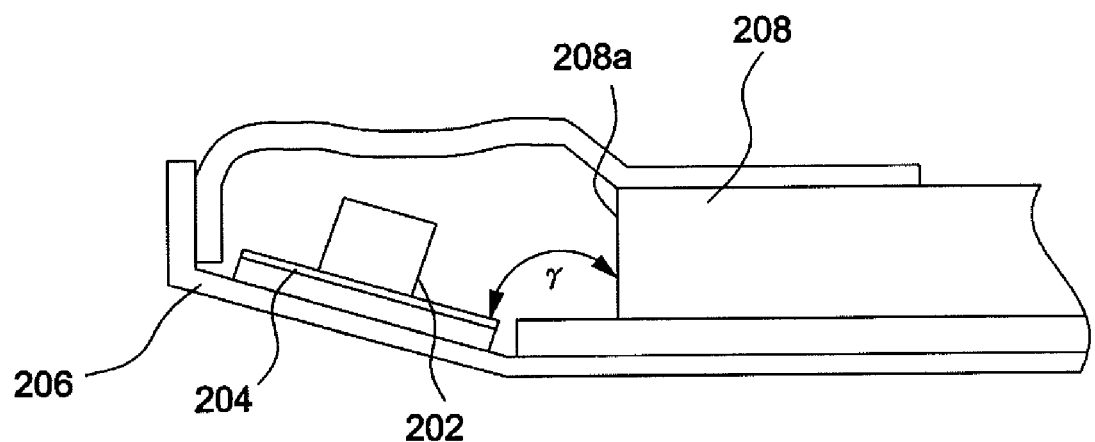
FIG. 3 shows a cross-section diagram illustrating another conventional light source module.
Figure 4:
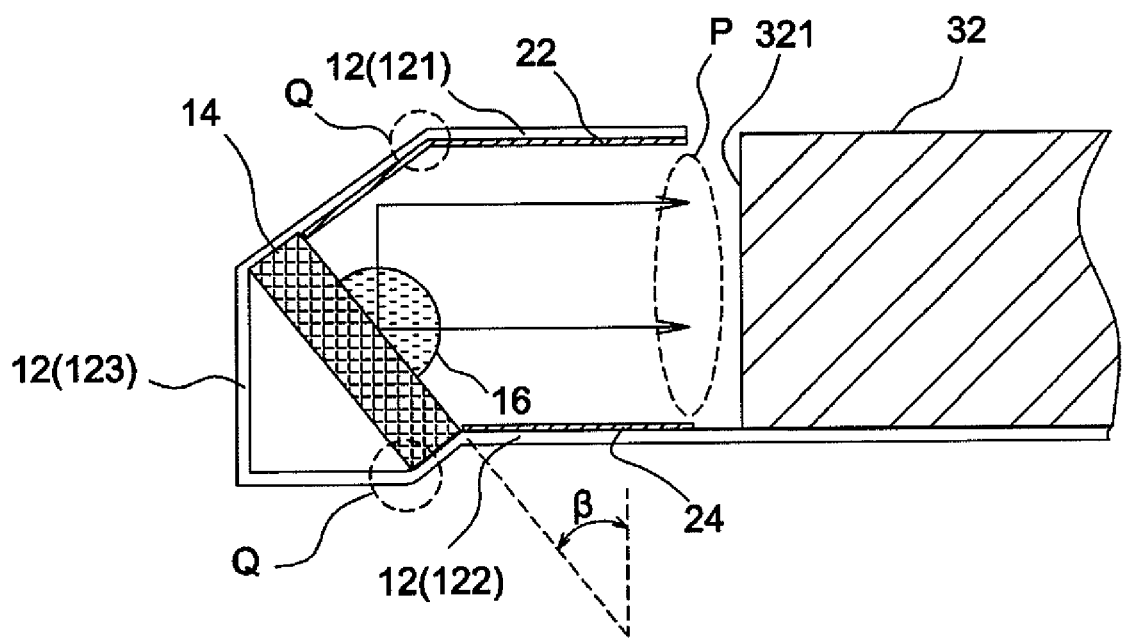
FIG. 4 shows a cross-sectional schematic diagram of a light source module according to an embodiment of the invention.

Referring to FIG. 4, a light source module 10 includes at least a casing 12, a light bar 14, and at least one light source 16 (such as an LED shown in FIG. 4) disposed on the light bar 14. The casing 12 includes a first side wall 121 and a second side wall 122, and the first side wall 121 and the second side wall 122 together define an opening P. The opening P faces a light incident surface 321 of a light guide plate 32, and the first side wall 121 and the second side wall 122 are respectively positioned on two opposite sides of the opening P. Besides, the light source module 10 may further include a third side wall 123 connected with the first side wall 121 and the second side wall 122, and the third side wall 123 faces the light incident surface 321 of the light guide plate 32. The light source 16 is disposed on one side of the light bar 14 facing the opening P. The light bar 14 is disposed on a slant inside the casing 12 and thus makes an angle β to the light incident surface 321. In this embodiment, a first reflective layer 22 is formed inside the casing 12 and adjacent to the first side wall 121, and a second reflective layer 24 is formed inside the casing 12 and adjacent to the second side wall 122. Further, the first reflective layer 22 is substantially parallel to the second reflective layer 24. Besides, the first side wall 121 or the second side wall 122 may have a bending portion Q. In this embodiment, the light source 16 may be an LED, and the chromaticity difference of the light source 16 satisfies the following equation:

$$\Delta Cx(\theta)=\text{Max}[Cx(\theta)]-\text{Min}[Cx(\theta)]>0.025; \text{ or}$$

$$\Delta Cy(\theta)=\text{Max}[Cy(\theta)]-\text{Min}[Cy(\theta)]>0.04.$$

Figure 5:
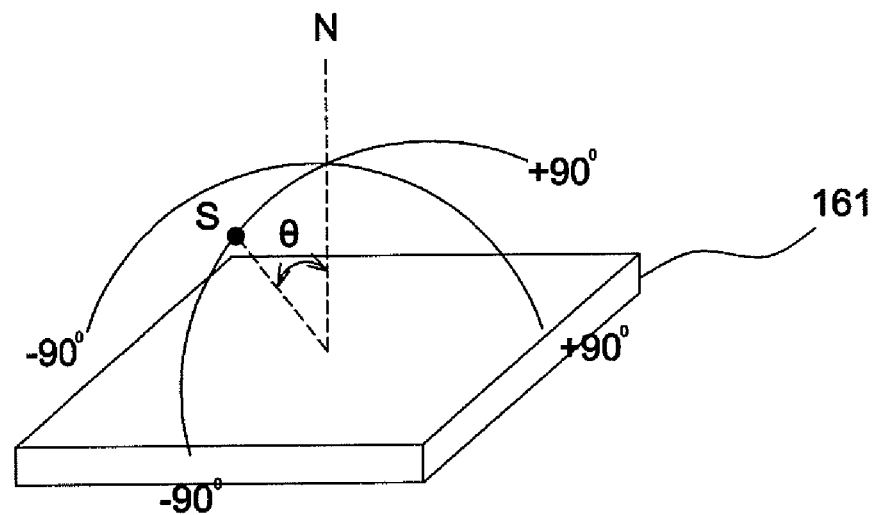
FIG. 5 shows a schematic diagram for illustrating the parameters defining the chromaticity difference.

Please refer to FIG. 5, assuming that the light source 16 has a light-emitting plane 161, and that θ is an included angle formed between a connecting line and the normal N of the light-emitting plane 161, with the connecting line being connected between a point S in the space and the center of the light-emitting plane 161, then $Cx(\theta)$ is a chromaticity coordinate value x measured at angle θ, $\text{Max}[Cx(\theta)]$ is a maximum of the chromaticity coordinate value x measured at angle θ, $\text{Min}[Cx(\theta)]$ is a minimum of the chromaticity coordinate value x measured at angle θ, $\Delta Cx(\theta)$ is a difference in the chromaticity coordinate value x measured at angle θ, $Cy(\theta)$ is a chromaticity coordinate value y measured at angle θ, $\text{Max}[Cy(\theta)]$ is a maximum of the chromaticity coordinate value y measured at angle θ, $\text{Min}[Cy(\theta)]$ is a minimum of the chromaticity coordinate value y measured at angle θ, and $\Delta Cy(\theta)$ is a difference in the chromaticity coordinate value y measured at angle θ.

Figure 6:
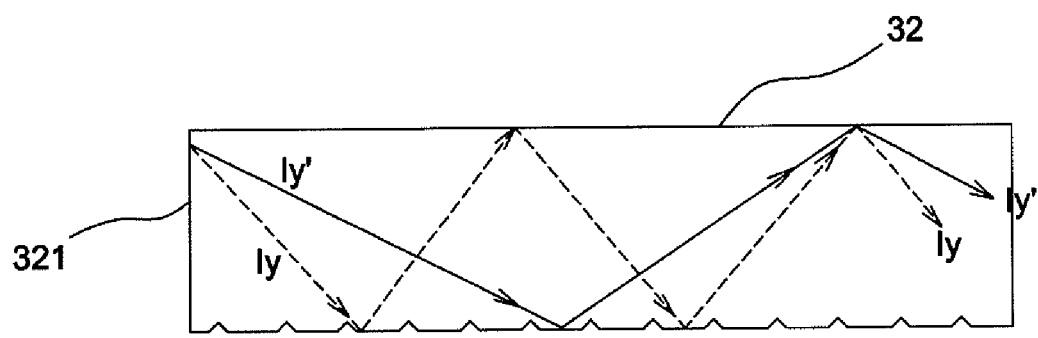
FIG. 6 shows a schematic diagram of light paths for illustrating the effect of improving color uniformity according to an embodiment of the invention.

FIG. 6 shows a schematic diagram of light paths for illustrating the effect of improving color uniformity according to an embodiment of the invention. In FIG. 6, solid lines indicate the path of yellowish white light Iy' entering a front section of the light guide plate 32, where a light bar is disposed on a slant and makes an angle β to the light incident surface 321. In comparison, dash lines indicate the path of yellowish white light Iy entering a front section of the light guide plate 32, where a light bar is conventionally disposed parallel to the light incident surface 321. Note the yellowish white light Iy and Iy' are emitted from a light source having a chromaticity difference of $\Delta Cx(\theta)>0.025$ or $\Delta Cy(\theta)>0.04$. As shown in FIG. 6, since the light bar is disposed on a slant, the yellowish white light Iy' is incident on the light guide plate 32 at a less steep angle, and thus the number of times the yellowish white light Iy' is reflected at a front end of the light guide plate 32 is reduced. As a result, light beams with respective color tones have a substantially identical number of times of reflection to equalize the chromaticity in different light-emitting regions of the light guide plate and thus improve the color uniformity.

Further, the manner that the light bar 14 is on a slant inside the casing 12 may reduce the occupied space of the casing 12 and the thickness of the light guide plate 32. In one embodiment, the angle formed between the light bar 14 and the light incident surface 321 is smaller than 30 degrees and larger than 10 degrees. Such range of angle may prevent the light bar from being too obliquely disposed and thus avoid an adverse impact on the brightness performance.

FIGS. 7A-7F show different arrangements of a light source module according to various embodiments of the invention. According to the above embodiments, the color uniformity is improved as long as the light bar 14 is disposed on a slant inside the casing 12, and the arrangement of the casing 12, the light bar 14, the reflective layers 22 and 24, and the light guide plate 32 is not limited. For example, the reflective layers 22 and 24 may be formed at the top of the casing 12 (FIG. 7A), at the bottom of the casing 12 (FIG. 7B), or at both the top and the bottom of the casing 12 (FIGS. 7C and 7D). The light bar 14 may lean against the casing 12 from an upper-left side to a lower-right side (FIGS. 7A and 7C) or from an upper-right side to a lower-left side (FIGS. 7B and 7D). Besides, the reflective layer 22 may lack a bending portion (FIGS. 7A-7D) or have a bending portion (FIGS. 7E and 7F).

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A light source module, comprising:
    a casing having a first side wall and a second side wall, wherein the first side wall and the second side wall define an opening, the opening faces a light incident surface of a light guide plate, and the first side wall and the second side wall are respectively positioned on two opposite sides of the opening;
    at least one reflective layer formed inside the casing and adjacent to one of the first side wall and the second side wall;
    a light bar disposed inside the casing and forming an angle with the light incident surface of the light guide plate; and
    at least one light source disposed on one side of the light bar facing the opening, and the light source satisfying the following condition:

$\Delta Cx(\theta)=\text{Max}[Cx(\theta)]-\text{Min}[Cx(\theta)]>0.025$, wherein the light source has a light-emitting plane, $\theta$ is an included angle formed between a connecting line and the normal of the light-emitting plane, the connecting line is connected between a point in the space and the center of the light-emitting plane, $Cx(\theta)$ is a chromaticity coordinate value x measured at angle $\theta$, $\text{Max}[Cx(\theta)]$ is a maximum of the chromaticity coordinate value x measured at angle $\theta$, $\text{Min}[Cx(\theta)]$ is a minimum of the chromaticity coordinate value x measured at angle $\theta$, and $\Delta Cx(\theta)$ is a difference in the chromaticity coordinate value x measured at angle $\theta$.

2. The light source module as claimed in claim 1, further comprising:
    a first reflective layer adjacent to the first side wall; and
    a second reflective layer adjacent to the second side wall and substantially parallel to the first reflective layer.

3. The light source module as claimed in claim 1, wherein at least one of the first side wall and the second side wall has a bending portion.

4. The light source module as claimed in claim 1, wherein the angle between the light bar and the light incident surface is smaller than 30 degrees and larger than 10 degrees.

5. The light source module as claimed in claim 1, further comprising a third side wall connected with the first side wall and the second side wall and facing the light incident surface of the light guide plate.

6. The light source module as claimed in claim 1, wherein the light source is a light emitting diode.

7. A light source module, comprising:
    a casing having a first side wall and a second side wall, wherein the first side wall and the second side wall define an opening, the opening faces a light incident surface of a light guide plate, and the first side wall and the second side wall are respectively positioned on two opposite sides of the opening;
    at least one reflective layer formed inside the casing and adjacent to one of the first side wall and the second side wall;
    a light bar disposed inside the casing and forming an angle with the light incident surface of the light guide plate; and
    at least one light source disposed on one side of the light bar facing the opening, and the light source satisfying the following condition:

$\Delta Cy(\theta)=\text{Max}[Cy(\theta)]-\text{Min}[Cy(\theta)]>0.04$, wherein the light source has a light-emitting plane, $\theta$ is an included angle formed between a connecting line and the normal of the light-emitting plane, the connecting line is connected between a point in the space and the center of the light-emitting plane, $Cy(\theta)$ is a chromaticity coordinate value y measured at angle $\theta$, $\text{Max}[Cy(\theta)]$ is a maximum of the chromaticity coordinate value y measured at angle $\theta$, $\text{Min}[Cy(\theta)]$ is a minimum of the chromaticity coordinate value y measured at angle $\theta$, and $\Delta Cy(\theta)$ is a difference in the chromaticity coordinate value y measured at angle $\theta$.

8. The light source module as claimed in claim 7, further comprising:
    a first reflective layer adjacent to the first side wall; and
    a second reflective layer adjacent to the second side wall and substantially parallel to the first reflective layer.

9. The light source module as claimed in claim 7, wherein at least one of the first side wall and the second side wall has a bending portion.

10. The light source module as claimed in claim 7, wherein the angle between the light bar and the light incident surface is smaller than 30 degrees and larger than 10 degrees.

11. The light source module as claimed in claim 7, further comprising a third side wall connected with the first side wall and the second side wall and facing the light incident surface of the light guide plate.

12. The light source module as claimed in claim 7, wherein the light source is a light emitting diode.

* * * * *